United States Patent
Fuertes Thomas et al.

(10) Patent No.: US 9,982,653 B2
(45) Date of Patent: May 29, 2018

(54) SYSTEM AND METHOD FOR REINFORCING A WEAKENED AREA OF A WIND TURBINE BLADE

(71) Applicant: GAMESA INNOVATION & TECHNOLOGY, S.L., Sarriguren (Navarra) (ES)

(72) Inventors: Juan Jose Fuertes Thomas, Sarriguren (ES); Irune Larisgoitia Astobiza, Zamudio (ES); Andres Riezu Corpas, Sarriguren (ES)

(73) Assignee: GAMESA INNOVATION & TECHNOLOGY, S. L., Sarriguren (Navarra) (ES)

( * ) Notice: Subject to any disclaimer, the term of this patent is extended or adjusted under 35 U.S.C. 154(b) by 1202 days.

(21) Appl. No.: 14/081,379

(22) Filed: Nov. 15, 2013

(65) Prior Publication Data
US 2014/0140848 A1    May 22, 2014

(30) Foreign Application Priority Data
Nov. 16, 2012 (ES) .................................. 201201140

(51) Int. Cl.
*F03D 1/00* (2006.01)
*F03D 1/06* (2006.01)
*F03D 80/50* (2016.01)

(52) U.S. Cl.
CPC .......... *F03D 1/003* (2013.01); *F03D 1/0675* (2013.01); *F03D 80/50* (2016.05); *Y02E 10/721* (2013.01); *Y10T 29/49318* (2015.01)

(58) Field of Classification Search
CPC ......... F03D 80/50; F03D 1/0675; F03D 1/003
See application file for complete search history.

(56) References Cited

U.S. PATENT DOCUMENTS

2010/0076614 A1* 3/2010 Nies ..................... F03D 17/00
                                                                            700/287
2011/0167633 A1* 7/2011 Anasis ................... B23P 6/002
                                                                            29/889.1

FOREIGN PATENT DOCUMENTS

DE           103 30 426 A1    1/2004
DE      10 2009 022 179 A1   11/2010
EP            2 273 102 A2    1/2011
EP            2 275 670 A2    1/2011

OTHER PUBLICATIONS

Espacenet English abstract of DE 103 30 426 A1 dated Sep. 10, 2013.
Espacenet English abstract of DE 10 2009 022 179 A1 dated Sep. 10, 2013.

* cited by examiner

*Primary Examiner* — Woody Lee, Jr.
*Assistant Examiner* — Maxime Adjagbe
(74) *Attorney, Agent, or Firm* — Ladas & Parry LLP (57) ABSTRACT

The invention refers to a system and method for reinforcing a weakened area of a wind turbine blade whose interior comprises a box beam extending from the blade root to the blade tip and wherein said box beam comprises an open end at the blade root. The system is characterized by comprising a repair module (100) adapted for moving inside the box beam and transporting a reinforcement element (107) from the blade root to the weakened area; and by the repair module (100), which is adapted for applying the reinforcement element (107) onto a interior surface of the box beam in the weakened area.

16 Claims, 10 Drawing Sheets

SYSTEM AND METHOD FOR REINFORCING A WEAKENED AREA OF A WIND TURBINE BLADE

The present invention refers to a system and method for reinforcing a weakened area of a wind turbine blade. In particular, the system and method of the present invention make reinforcement of a weakened area of the wind turbine blade possible when the blade is mounted on the wind turbine, which avoids any need for dismounting the blade from its operating position and lowering it to the ground to reinforce the weakened area. Additionally, the system and method of the present invention enables the reinforcement of a weakened area even if the area is far from the wind turbine blade root and having reduced dimensions.

BACKGROUND OF THE INVENTION

The development of larger and more powerful wind turbines has required an increase in the dimensions of the wind turbine rotor and the consequential lengthening of wind turbine blades. Such a lengthening of the blades entails an increase in their rigidity, which usually implies the use of carbon fiber or fiberglass based laminated materials.

The inside of a wind turbine blade normally comprises a structural element that gives the blade rigidity. The structural element is enclosed between two shells that constitute the outer structure of the blade and give the blade its aerodynamic shape.

The structural element is normally a box beam, i.e., a hollow rectangular beam that narrows progressively from the blade root to the tip. The box beam comprises two wider walls (caps), which are designed for placement perpendicular to the wind direction, and two narrower walls (webs) on each side of the caps.

The lamination process during blade manufacturing is done manually and thus the total absence of defects, such as the formation of wrinkles while applying laminate layers of material, cannot be ensured easily. These defects could result in the appearance of weaker spots along the blade box beam that are incapable of withstanding the established design loads.

When the wind turbine is in service, given the highly elevated loads that the blades undergo, the presence of weakened areas on the blade raises the likelihood of cracks stemming from material fatigue that could, in the most extreme cases, even cause the blade to fracture.

The sole known method in the state of the art for repairing defects of this sort on the blade box beam entails replacing the entire affected laminate. This method is highly aggressive for the blade, since it entails cutting and burrowing into a section of the shell of up to six meters in length to gain access to and repair the weakened area on the box beam, and subsequently reconstructing the eliminated section of the shell. Given this method's aggressiveness, operations must be done by qualified technicians in environments with controlled conditions. The repair time for such a method is thus long (typically over 300 hours) and consequently expensive.

Moreover, this method has an added inconvenience in that the blade cannot be repaired while mounted on the wind turbine, thus necessitating the additional stages of dismounting the blade, lowering it to the ground level, and moving it to the repair plant, all of which makes the entire process much more expensive.

Documents US 2011/167633 and EP 2 273 102 describe methods for repairing a damaged surface on a wind turbine blade shell. This repair is carried out from outside the blade.

The use of wind turbine blade inspection and cleaning devices is common in the current state of the art. For instance, EP 2 275 670 and DE 10330426 disclose devices that move on the outer part of the blade, and thus their functions are constrained to inspecting the shell, though incapable of accessing inside the blade box beam.

The use of devices adapted for inspecting the inside of a wind turbine blade is also common. DE 102009022179 discloses a device that slides while suspended into a blade pointing towards the ground, and Spanish patent application no. 201100618 (still unpublished on the submission date of the present application) describes an inspection carriage capable of moving along inside the box beam of a wind turbine blade. Nevertheless, none of these documents disclose or suggest a device adapted for repairing a surface on the box beam in the weakened blade area.

It would thus be desirable to have a system, and a method, to reinforce a weakened area of a wind turbine blade quickly and economically, and, in particular, with no need to have to dismount the blade from its service position.

DESCRIPTION OF THE INVENTION

The inconveniences cited above are solved with the system according to claim 1 and the method according to claim 15, which likewise bear additional advantages that are described below.

One object of the present invention refers to a system for reinforcing a weakened area of a wind turbine blade when this blade is mounted on a wind turbine, where the blade interior comprises a box beam extending from the blade root to the blade tip and wherein said box beam has an open end at the blade root. This system is characterized by comprising a repair module adapted for moving inside the box beam and transporting a reinforcement element (such as one or various reinforcement laminates) from the blade root to the weakened area; and by the repair module, which is adapted for applying the reinforcement element onto a interior surface of the box beam in the weakened area.

As mentioned above, none of the aforementioned systems permit the reinforcement of the box beam in the weakened area of the wind turbine blade by accessing from inside the beam box and applying reinforcement material on an internal surface therein. With the system of the invention, the box beam can be reinforced with no need to open a section on the blade shell, and it is thus a non aggressive process for the blade. Consequently, the system of the invention enables the reinforcement of a weakened area of a wind turbine blade, thus ensuring that it can withstand loads exceeding the originally established loads quickly and economically.

Additionally, having the repair module adapted to move along the inside of the beam box enables the reinforcement operation even when the wind turbine blade is mounted in its service position. This thus precludes any need to dismount and move the blade to a plant for remote repair. However, it is also apparent that this weakened area reinforcement operation can also be carried out with the blade dismounted and on the ground.

The dimensions and traction capacity of the repair module make it suitable for moving inside a box beam positioned substantially horizontal to the ground while transporting a reinforcement element to the weakened area of the blade. In particular, the repair module comprises means for transporting a reinforcement element inside the box beam from the blade root to the weakened area.

Once positioned in the weakened area of the blade, the repair module can apply pressure against at least one of the box beam walls, and is thus suitable to apply the reinforcement element (preferentially made of an adhesive material or material coated with an adhesive film) to the inner surface until the reinforcement element is adhered. In particular, the repair module comprises the means for applying the reinforcement element on this inner surface.

The inner surface of the box beam normally comprises a portion of the internal face of one of the box beam walls, preferentially a box beam cap, though this inner surface in certain embodiments is made of portions of two or more inner faces of the box beam walls.

Advantageously, the system comprises an assembly of interchangeable functional units, among which the repair module forms a tractor unit equipped with coupling elements to couple against an interchangeable functional unit selected for the assembly. Additionally, this tractor unit is adapted to drive the mentioned interchangeable functional unit and the assembly of interchangeable functional units has an expansion unit adapted to transport the reinforcement element and apply it to the inner surface mentioned above.

The use of different interchangeable functional units diversifies the possible tasks that can be carried out on the inner surface to reinforce (e.g., washing, sanding or even vacuuming the residue from the sanding) prior to applying the reinforcement element. Moreover, given that these functional units are interchangeable, the repair module need not integrate all units simultaneously, which thus reduces the total weight that the tractor unit pushes (or pulls) during each of the preliminary tasks before applying the reinforcement element. Otherwise, the dimensions of the motor that the tractor unit would require would no longer allow the tractor unit to move through the box beam to weakened areas further from the blade root.

Preferentially, the expansion unit comprises means for fastening the reinforcement element while the repair module moves to the weakened area of the blade, and means of expansion operationally coupled to the fastening means for using pressure to apply the reinforcement element onto the inner surface.

More preferentially, the expansion unit comprises a spacer element so as to keep the fastening means from touching the box beam walls while the repair module moves to the weakened area of the blade.

This thus prevents a reinforcement element, whether adhesive material or coated with an adhesive film, from touching the beam box walls and unintentionally affixing to them.

In some embodiments, the tractor unit advantageously comprises: a body consisting of a motor for driving a notched wheel coupled thereto, being this notched wheel adapted to roll along the first box beam wall, and equipped with an articulated arm protruding from the body that is adapted to remain in contact with a second box beam wall (opposite to the first box beam wall) while the repair module moves inside the box beam.

The tractor unit brings each interchangeable functional unit to the weakened area and must thus be capable of pushing or pulling elevated weights (e.g., the weight of an expansion unit loaded with one or various reinforcement elements could weigh up to 100 kg).

The notched tooth ensures good traction on the first beam box wall, especially considering that the walls inside the beam box are smooth and hard notwithstanding the common presence of oil.

The articulated arm ensures the stability of the tractor unit by maintaining the contact with the second wall and thus keeping the tractor unit from overturning while pushing a heavy interchangeable functional unit.

Advantageously, the interchangeable functional unit assembly comprises a cleaning unit consisting of the means to apply at least one chemical product or detergent on the inner surface. This functional unit enables the elimination of dirt or oil from the inner surface to reinforce.

Preferentially, the interchangeable functional unit assembly comprises a sanding unit consisting of a grinding device mounted on a mobile head.

This thus enables the elimination of material remains that might have remained inside the beam box during its manufacture and that could interfere with the application of the reinforcement element. The sanding unit provides the inner surface intended for reinforcement with a roughness appropriate for affixing the reinforcement element.

More preferentially, the sanding unit comprises the first actuating means to position the mobile head depending on the path contained on a plane perpendicular to the inner surface, and contains the direction of movement of the repair module. These first actuating means enable the grinder to be positioned against the inner surface for sanding.

Advantageously, the sanding unit comprises secondary actuating means to bring the mobile head to an oscillating movement depending on the path contained on a plane parallel to the inner surface. The entire inner surface to reinforce can be worked evenly with the oscillating movement of the grinder.

In these cases, more advantageously, the mobile head of the sanding unit is equipped with sensors to delimit the path of this oscillating movement when detecting a beam box wall. Thus, the mobile head changes the direction of its oscillating movement when detecting an obstacle.

The set of interchangeable functional units preferentially comprises a suction unit that comprises an intake mouth, means to adapt the size of this intake mouth to the crossbeam of the beam box, and a spacer element to ensure a separation between the inner surface and the intake mouth.

Said suction unit eliminates any dirt from the inner surface intended for reinforcement and the dust generated during the sanding of this inner surface, thereby preparing it for the application of the reinforcement element. The means for adapting the size of the intake mouth to the size of the section of the box beam together with the spacer element enables the intake mouth provides a uniform suction capacity along the inner surface of the box beam regardless the position of the weakened area on the wind turbine blade.

Optionally, the suction unit could additionally be equipped with one or more brushes adapted for sweeping the inner surface of the box beam intended for reinforcement, thus guaranteeing its cleanliness for affixing the reinforcement element.

Advantageously, the repair module comprises a video camera and a lighting system. The video camera enables all the operations to be viewed, thus ensuring the quality of the repair process. If necessary, the video camera can record for reviewing the operations later. More advantageously, this video camera and this lighting system is located in the sanding unit.

Preferentially, the system comprises a control unit interconnected with the repair module and, optionally, a support adapted to secure this control unit inside the blade root.

The control unit furnishes a supply (for instance, electrical, pneumatic, hydraulic or vacuum for suction) to the repair module and controls its operation at all times. The control unit preferentially comprises a recording system interconnected with the video camera of the repair module to record all operations for subsequent viewing. The support adapts to the curved surface inside the blade, securing the control unit with stability and preventing it from overturning.

Advantageously, the system comprises a positioning element configured to anchor itself to the box beam near the blade root and a guide bar placed on the beam box between the repair module and this positioning element, in which this guide bar comprises one or more sections connected together and coupled as the repair module moves along the box beam and in which the positioning element prevents crosswise movement of the guide bar inside the box beam.

As the repair module enters further into the box beam, it has a twisting force pushing crosswise compared to the direction of progress against the box beam walls. The positioning element together with the guide bar, compensate the twisting force on the repair module, keeping it from deviating from its path.

In addition, the guide bar has the advantage of housing the connection cables of the repair module with the control unit by maintaining them collected.

The present invention also refers to a method for reinforcing a weakened area of a wind turbine blade whose interior comprises a box beam extending from the blade root to the blade tip and wherein said box beam has an open end at the blade root. This method is characterized by comprising stages of:
- transporting a reinforcement element inside the box beam from the blade root to the weakened area, and
- applying the reinforcement element on an inner box beam surface in the weakened area.

Advantageously, the method could entail at least one of the following stages, which could be carried out independently and in any order:
- cleaning this inner surface by applying at least one chemical product or detergent on the inner surface
- sanding this inner surface, and
- eliminating the dirt or dust from this inner surface by suction.

BRIEF DESCRIPTION OF THE FIGURES

For the sake of better understanding the foregoing, some figures have been attached that, while schematically illustrating a case of practical embodiment, are not limited to this mere example.

FIGS. 5a (front view) and 5b (plan view) schematically illustrate an example of the repair module according to the invention that comprises a tractor unit coupled to a cleaning unit.

FIG. 6b is a detailed illustration of sanding unit from FIG. 6a.

DESCRIPTION OF A PREFERRED EMBODIMENT

Figure 1:
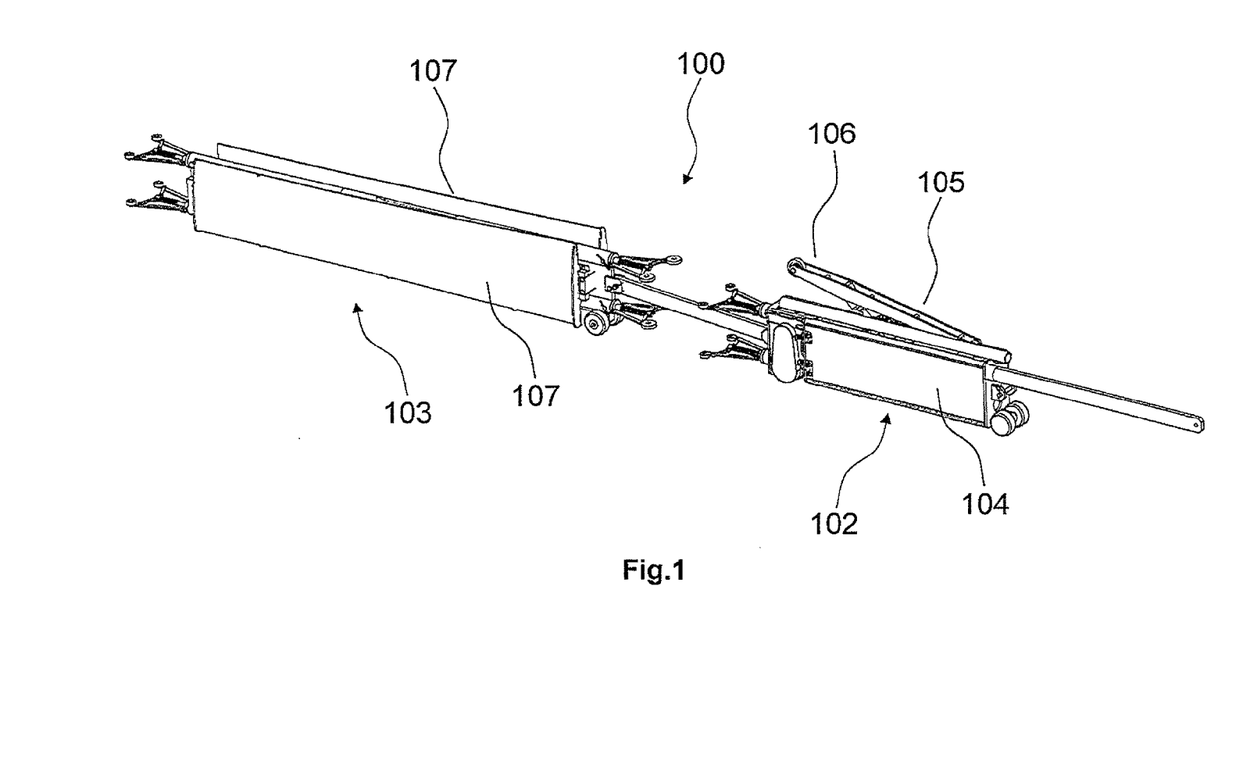
FIG. 1 shows a repair module of the system according to the present invention.

Below is a description of a preferred embodiment of the invention with reference to the figures, one by one:

FIG. 1 illustrates a repair module 100 of a system for reinforcing a weakened area on a wind turbine blade according to the present invention. The repair module 100 is adapted for moving inside the blade (not illustrated in the figure), and its reduced size (the repair module has a maximum cross section of less than a DIN A4 sheet of paper) enabling it to move through the inside of the box beam from the root to the furthest areas (where the box beam has a cross section of approximately 100 mm×300 mm).

In particular, the repair module 100 is adapted for moving on one of the box beam webs and can apply a reinforcement element onto at least one of the caps of the box beam.

The system of the present invention comprises a set of interchangeable functional units for undertaking a variety of tasks on the inner box beam surface during the repair of the weakened blade area. In addition, the repair module 100 comprises a tractor unit 102 equipped with a means of coupling (not shown in the figure) that is mounted behind an interchangeable functional unit and is used to bring it to the weakened area. FIG. 1 particularly illustrates an expansion unit 103 adapted for transporting a reinforcement element 107 and applying it onto the surface inside the box beam to reinforce. In the figure, the expansion unit 103 is mounted in front of the tractor unit 102.

The tractor unit 102 comprises a body 104 that houses a high power electric motor, since the weight of some of the interchangeable functional units could exceed 70 kg. For this reason, the motor occupies virtually all of this body 104. The motor receives current from a control unit for the system (not illustrated in the figure).

The tractor unit 102 also comprises a notched wheel (not illustrated in the figure) coupled to the body 104, particularly in the lower part of this body 104 and driven by the motor, and is adapted to roll on one of the box beam webs (first wall acting as ground); and an articulated arm 105 driven by a pneumatic system that is adapted to maintain contact with the other web of the box beam (second wall opposite the first and acting as a roof).

The end of the articulated arm 105 has a wheel 106 adapted for rolling on the roof and being compressed as the repair module 100 advances towards the blade tip. The tractor unit 102 can thus be secured with stability and to keep it from overturning.

The tractor unit 102 includes pneumatic, hydraulic, electrical and suction connections for supplying the various interchangeable functional units depending on the work to carry out.

Figure 2:
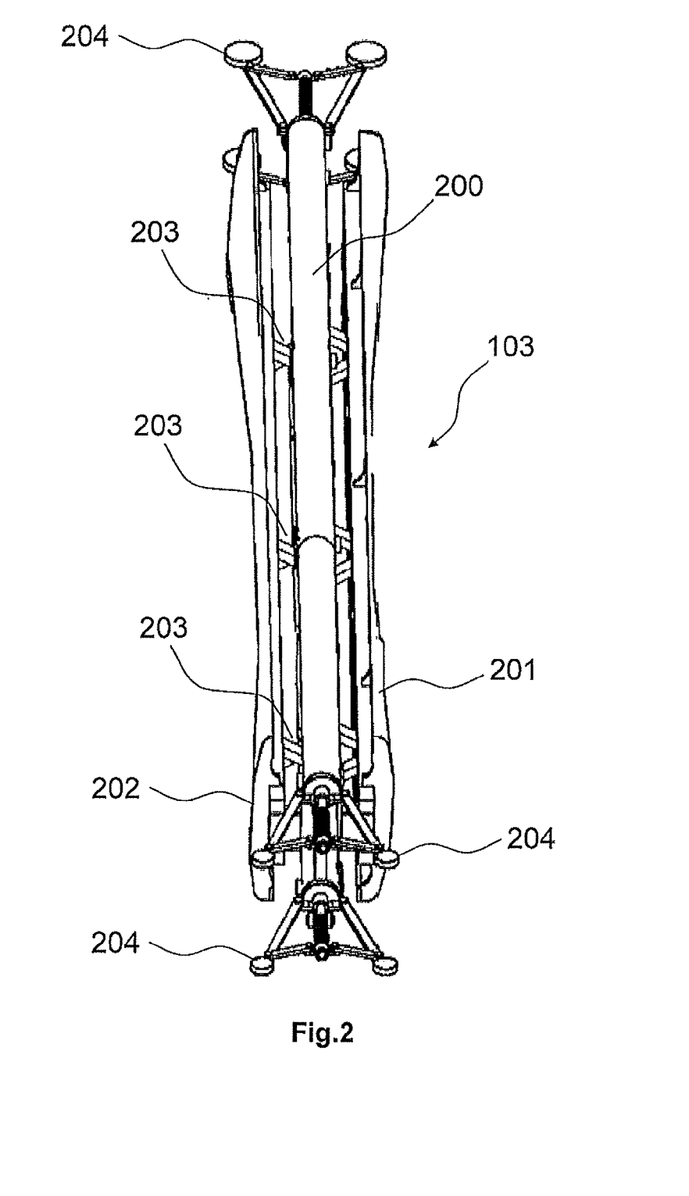
FIG. 2 shows an example of an expansion unit according to the invention.

As shown in FIG. 2, the expansion unit 103 comprises two ribs 201, 202 for securing each reinforcement element while the repair module 100 moves inside the box beam. Each reinforcement element will be applied onto each of the two box beam caps, with which the expansion unit 103 enables both caps to be reinforced simultaneously.

The expansion unit 103 also contains a central body 200, which can advantageously comprise various modules coupled with bolts and quick fittings, where there are some hydraulic expansion means 203 operationally coupled to the ribs 201, 202. When activated, these expansion means 203 project the ribs 201, 202 towards the box beam caps, pressing the reinforcement element 107 against the caps until they achieve its adherence.

Given that the reinforcement element 107 is coated with an adhesive film, it is essential that the adhesive does not touch the box beam walls while the repair module 100 moves to the weakened area. Unintended contact could entail a loss of part of the adhesive applied on the reinforcement element 107 and consequently result in a deficient application of the reinforcement element 107 on the inner surface to reinforce in the box beam. To this effect, the expansion unit 103 comprises extenders 204 on both ends that serve as spacer elements to keep the adhesive from touching the caps.

Figure 3:
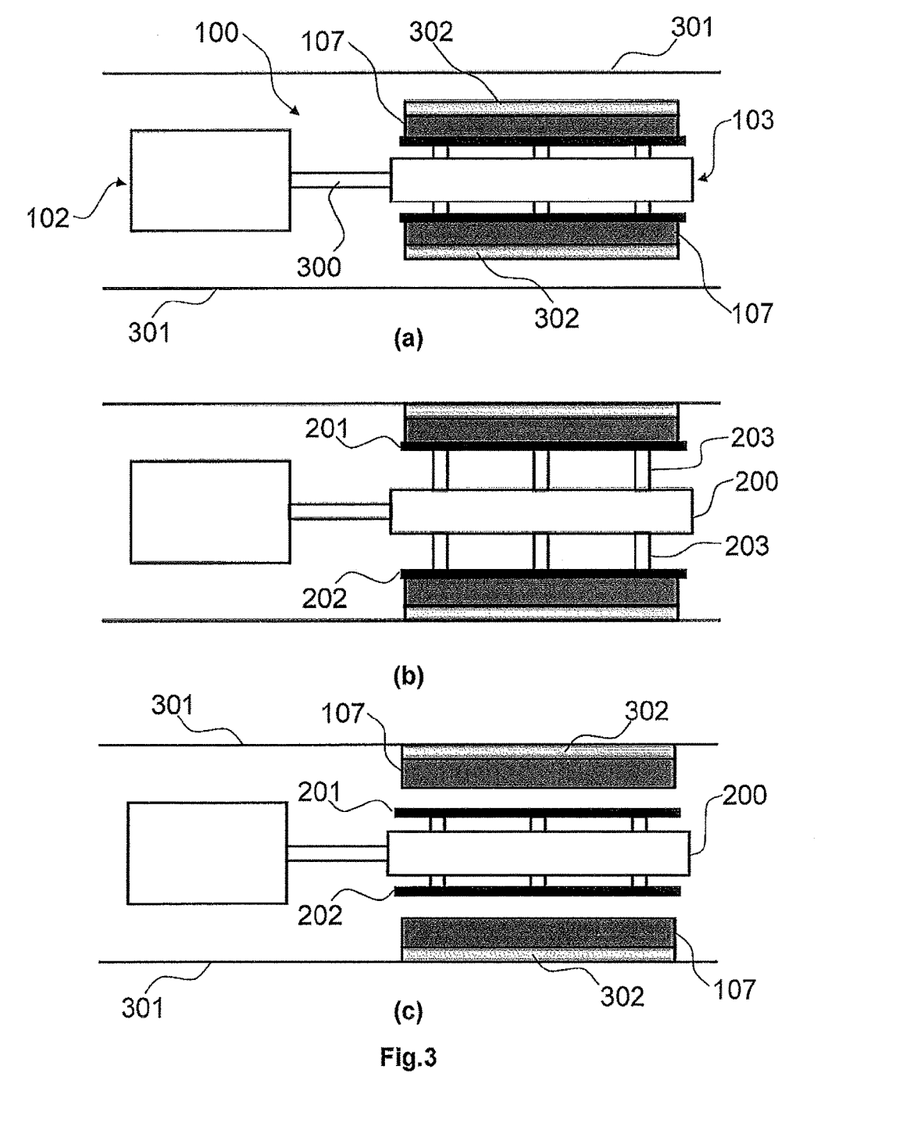
FIG. 3a schematically shows a repair module according to the invention that comprises a tractor unit coupled to an expansion unit positioned for applying a reinforcement element onto a surface inside the box beam.
FIG. 3b illustrates the repair module of FIG. 3a with the means of expansion of the expansion unit expanded for applying the reinforcement element onto the surface inside the box beam.
FIG. 3c illustrates the repair module of FIG. 3a with the expansion means of the expansion unit retracted after applying the reinforcement element onto the surface inside the box beam.

The process for applying the reinforcement element 107 onto the box beam caps is schematically illustrated in FIGS. 3a-3c.

FIG. 3a illustrates the repair module 100 positioned inside the box beam ready for the application of reinforcement elements 107 onto the box beam caps 301. This figure depicts the coupling means 300 enabling the coupling of the tractor unit 102 with the expansion unit 103.

The reinforcement elements 107 are coated with a layer of adhesive 302. Each reinforcement element 107 will be secured to one of the ribs 201, 202 of the expansion unit 103 with, for instance, Velcro strips placed between these ribs 201, 202 and the face of the reinforcement element 107 in contact with the ribs 201, 202. The number of strips, their length and position are appropriate for securing the reinforcement elements 107 that can weigh between 10 kg and 20 kg.

Some cork blocks (not shown in the figure) can be advantageously mounted on the adhesive layer 302 to act as spacers between the reinforcement element 107 and the box beam wall 301, ensuring a predetermined adhesive thickness after the means of expansion 203 project and compress the reinforcement element 107 against the wall 301. It is essential to guarantee a certain minimum adhesive thickness capable of distributing the load from the weakened area on the blade to the mounted reinforcement element.

During the application stage (FIG. 3b), hydraulic pressure is introduced into the system so that the means of expansion 203 separates the ribs 201, 202 until the reinforcement elements 107 touches the caps 301. Preferably, the control unit of the system enables the introduction of hydraulic pressure of at least up to 100 bar.

The means of expansion 203 keep the ribs 201, 202 in the expanded position for a time sufficing to allow the adhesive deposited on the reinforcement elements 107 to cure. This curing time depends on the ambient temperature.

Once the adhesive has cured (FIG. 3c), the hydraulic pressure is introduced in the opposite direction to compress the means of expansion 203 and withdraw the ribs 201, 202 until they are retracted onto the central body 200 of the expansion unit 103. Following repair of the weakened area, the repair module 100 moves towards the blade root to be removed from the blade.

Figure 4A:
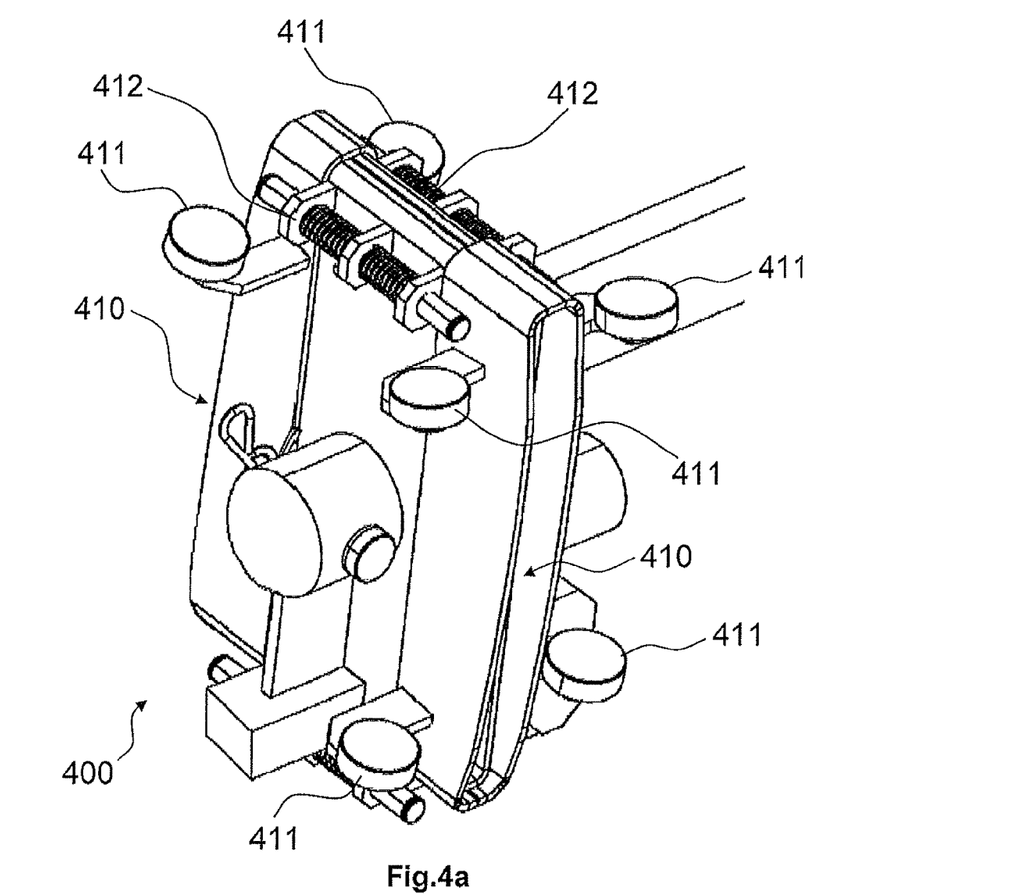
FIG. 4a is a detailed illustration of a suction unit.

FIG. 4a illustrates a detailed view of one suction unit 410 and a intake mouth 410 mounted on each side of the suction unit to work, respectively, on each box star cap. Some small wheels 411 mounted on both sides of the intake mouth 410 serve as a spacer element, keeping a separation between the intake mouth 400 and the box beam wall. Keeping the intake mouth 400 from touching this wall will ensure a correct capacity of suction.

Advantageously, the suction unit 400 comprises some springs 412 for adjusting the size of the intake mouth 410 to the transverse section of the box beam. As the repair module 100 advances to the blade tip, the springs 412 begin compressing progressively so as to enable the passage of the suction unit 400 while maintaining the separation between the intake mouth 410 and the box beam walls.

In some embodiments, the suction unit is additionally equipped with a system of brushes.

Furthermore, the repair module advantageously has a video camera (not illustrated) coupled to the suction unit 400 for viewing the repair process (in this particular case, the task of suctioning dirt or dust generated while sanding the inner surface of the box beam to reinforce).

Figure 4B:
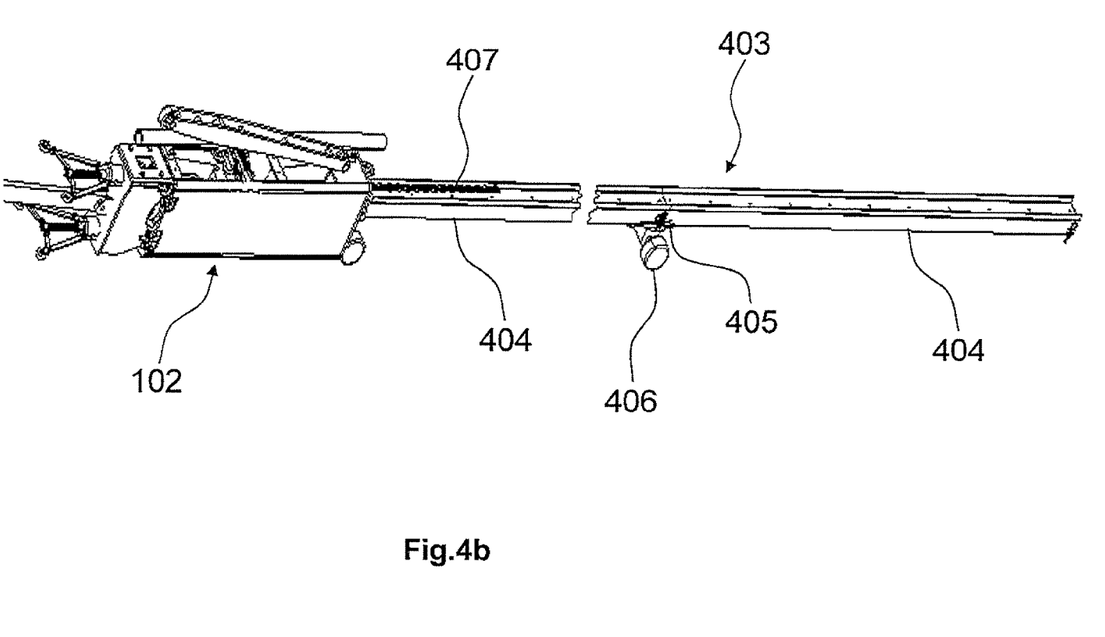
FIG. 4b illustrates a tractor unit connected to a guide bar.

FIG. 4b illustrates the tractor unit 102 of a repair module 100, likewise depicting a guide bar 403 mounted on the box beam between the tractor unit 102 of the repair module 100 and the control unit of the system.

In the figure, the guide bar 403 comprises various sections 404, preferably between 1 m and 2 m length, and connected together by some bolts and bushings 405 to secure their joint. These sections 404 begin coupling as the repair module 100 moves along the box beam.

Advantageously, a skate with wheels 406 can be mounted on each certain number of sections 404, e.g., every 3 sections, that aids the movement of the guide bar 403 and keeps it from touching and scratching the box beam.

Through the guide bar 403, the repair module 100 can be pushed manually or in support if the tractor unit 102 slides and can no longer advance. On the other hand, the supply cables (electrical, hydraulic, etc.) 407 of the repair module 100 can be kept collected with the guide bar 403.

Figure 5:
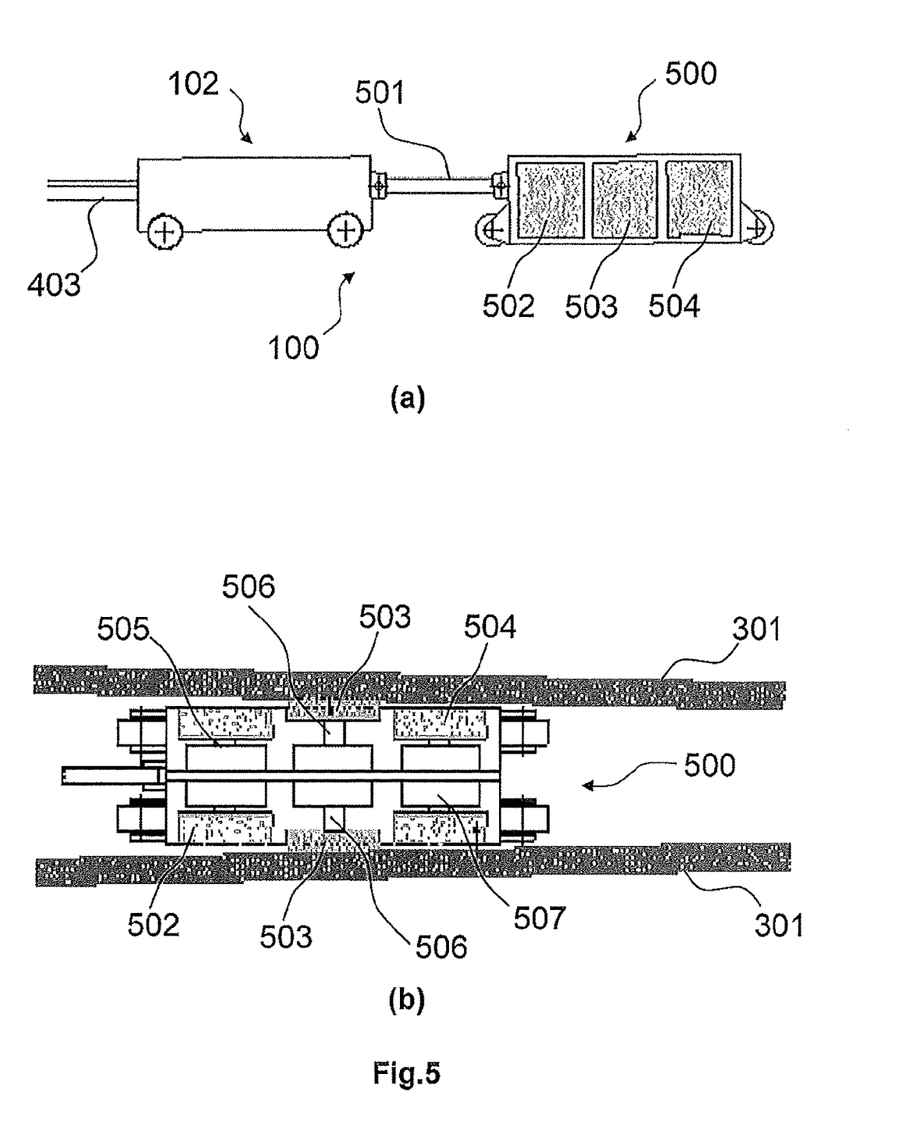

The system of the present invention can comprise a cleaning unit 500 as shown schematically in FIG. 5, coupled through means of coupling 501 to the tractor unit 102. The cleaning unit 500 contains some sponges 502, 503, 504 for applying at least a chemical product or detergent on the inner surface to reinforce on the caps 301 of the box beam to eliminate, for instance, the remains of oil. The sponges 502,503, 504 can apply a detergent sequentially on a box beam wall, rinse and finally dry and eliminate the remains of the employed cleaning product.

Some actuators 505, 506, 507, preferentially pneumatic or electrical, enable the extension and withdrawal of the sponges 502, 503, 504 selectively.

Figure 6A:
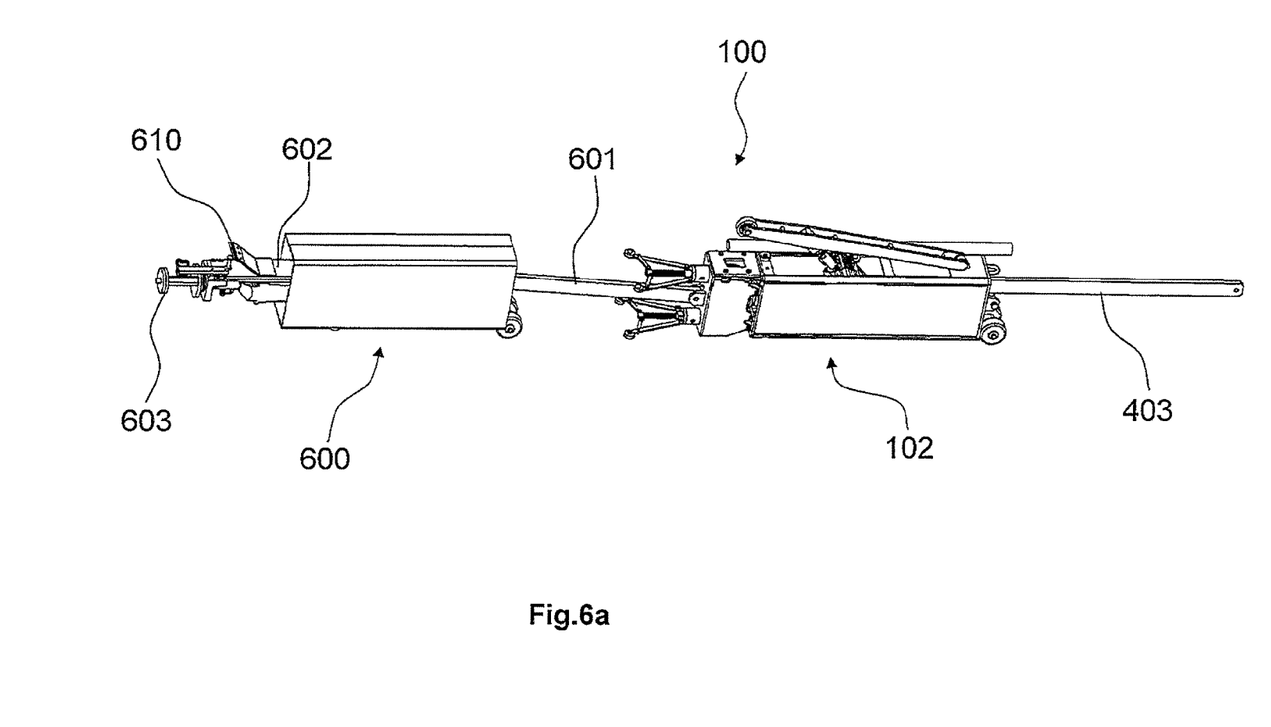
FIG. 6a illustrates an example of the repair module according to the invention that comprises a tractor unit coupled to a sanding unit.
Figure 6B:
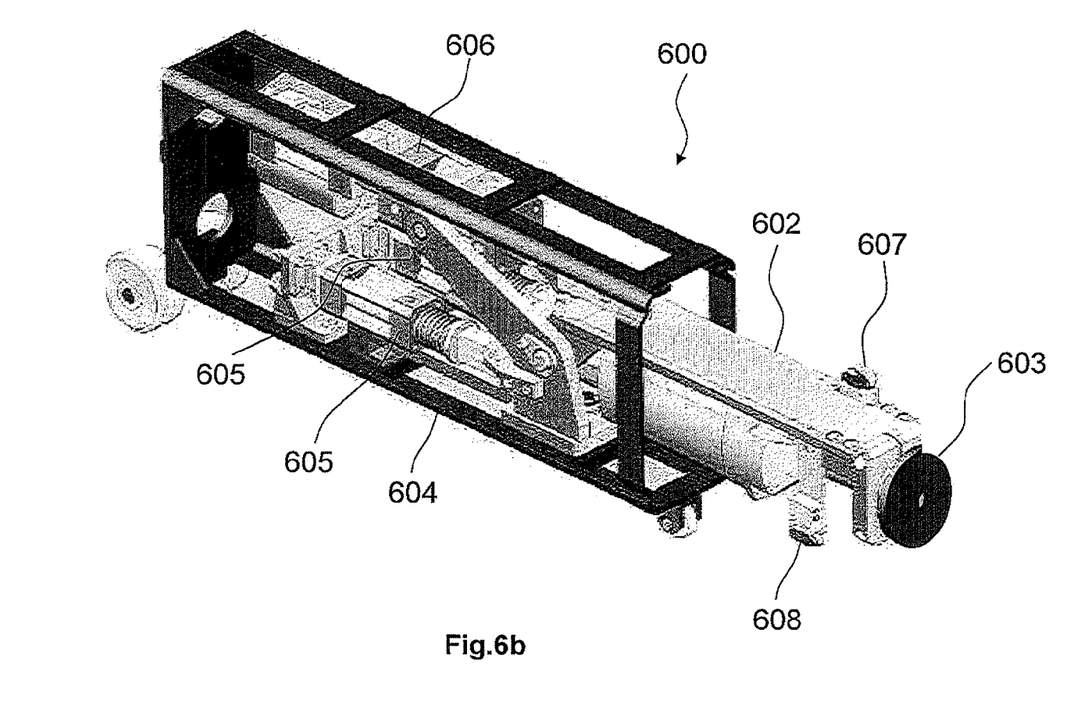

FIG. 6a illustrates a repair module 100 on which the tractor unit 102 is coupled through some means for coupling 601 to a sanding unit 600, whose structure is depicted in FIG. 6b.

The sanding unit 600 comprises a frame 604 equipped with a protruding mobile head 602 furnished with a grinder 603. This sanding unit 600 comprises a first pneumatic valve 605 housed on this frame 604 for moving the mobile head 602 following a path within a horizontal plane (i.e., parallel to the box beam webs) and positioning this mobile head 602 on the inner surface to reinforce (on one of the caps). The selection of which side to move the mobile head is selected from the control unit.

In order to get movement on a vertical plane (i.e., parallel to the box beam caps), the sanding unit 600 has a second pneumatic valve 606 housed in the frame 604 and configured for creating the oscillating movement of the mobile head 602. The path of this oscillating movement is limited by a pair of sensors 607, 608 mounted on opposites faces of the mobile head 602. When the upper sensor 607 detects the web that makes the "roof" of the box beam, it makes the pneumatic valve 606 switch direction to drive the mobile head downwards. The opposite occurs when the lower sensor 608 detects the web that serves as the "floor".

This oscillating movement in conjunction with the advance of the sanding unit 600 driven by the tractor unit 102 enables it to reach the entire inner surface intended for reinforcement in the box beam caps.

The sanding unit 600 can optionally have a scraper 610 mounted on the upper part of the mobile head (on the same face as the upper sensor 607) so that, in case there is vacuum bag or adhered material to the roof of the box beam, it can be eliminated.

Figure 7:
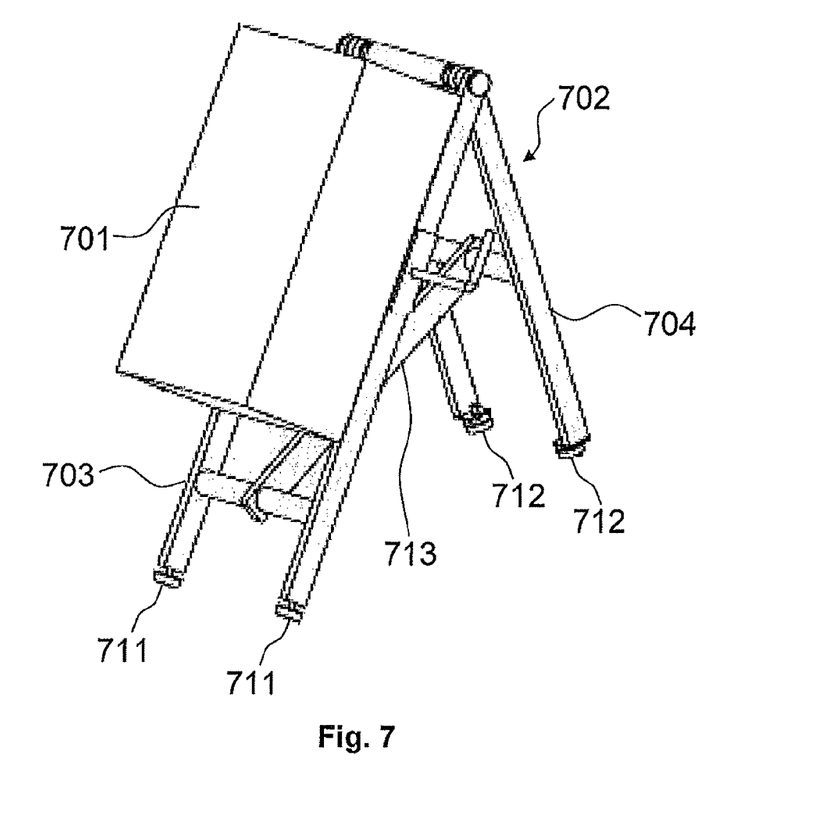
FIG. 7 shows a control unit and its support according to the present invention.

In a preferential embodiment, the system of the present invention comprises a control unit from which the work that the repair module undertakes at any given moment is controlled. FIG. 7 shows a control unit 701 adapted to be mounted inside the wind turbine blade, near the root. Advantageously, the control unit 701 is mounted on a support 702 adapted to the inner blade contour to prevent the control unit 701 from overturning.

The support 702 resembles a stepladder and comprises a first member 703 with two stringer connected by at least two crossbars and a second member 704 with another two stringers connected by at least one crossbars. The stringers on the first member 703 are equipped with adjustable feet on one end, defining a first brace 711 on the inner blade contour. The stringers on the second member 704 have one end coupled to a first crossbar of the first member 703 and the other end is equipped with adjustable feet, defining a second brace 712 on the inner blade counter. The support 702 comprises a fastening bar 713 mounted between the second crossbar of the first member 703 and a crossbar of the second member 704.

Preferentially, the support 702 comprises hooks (not shown in the figure) that allow having tools and other materials organized during the blade repair process.

In another embodiment, the control unit is mounted in the wind turbine nacelle for the sake of more space and visibility.

Figure 8:
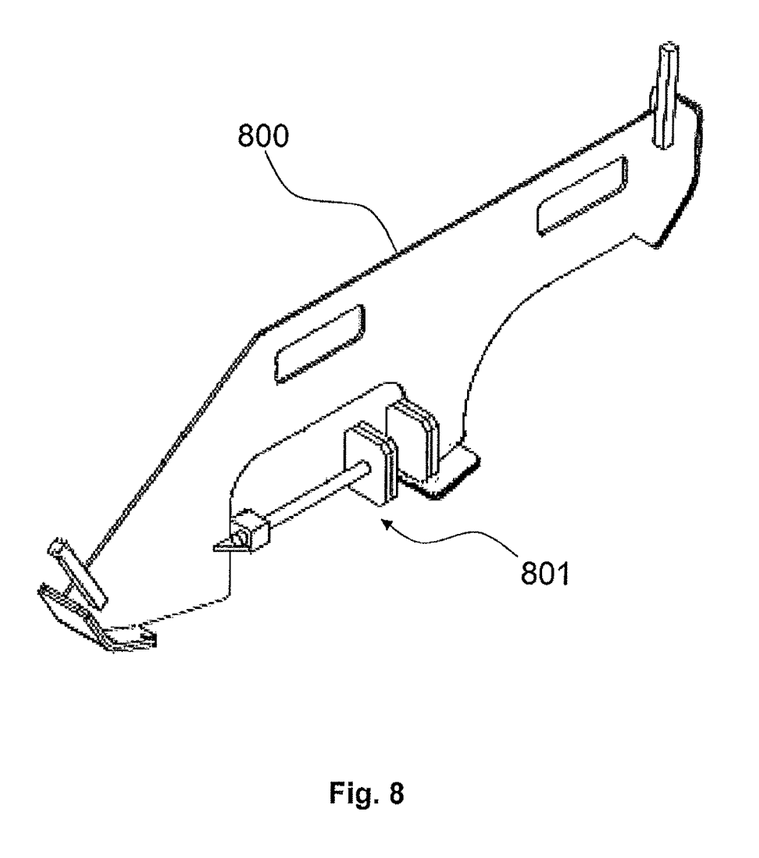
FIG. 8 shows a positioning element for a guide bar of a system according to the present invention.

The system of the present invention comprises a positioning element, element 800 in FIG. 8, with a suitable geometry for anchoring onto the lower part of the box beam near the blade root. The positioning element 800 comprises a fastening mechanism 801 that defines the position of the guide bar (not illustrated in the figure) within the box beam and prevents it from moving in a direction transversal to the advancing direction of the repair module 100.

In one preferential embodiment of the system, the tractor unit 102 and/or at least some of the interchangeable functional units 103, 400, 500, 600 can be detachable in two or more blocks so as to simplify handling and transport in the wind turbine tower. More preferentially, none of these blocks exceeds a maximum weight of 25 kg.

According to one preferential embodiment, the method for reinforcing a weakened area on a wind turbine blade according to the present invention entails stages of:
- cleaning an inner surface of the box beam at the weakened area by applying at least one chemical product or detergent on the inner surface
- sanding this inner surface
- eliminating through suction the dirt from this inner surface and/or dust generated during sanding
- transporting a reinforcement element inside the box beam from the blade root to the weakened area, and
- applying the reinforcement element on the inner surface to reinforce with pressure until this reinforcement element adheres thereto.

While there is a reference to a specific embodiment of the invention, it is nevertheless obvious that an skilled in the art would find the described system and method of the invention susceptible to numerous variations and modifications, and all the details mentioned herein could be substituted by other technically equivalent details without departing from the scope of protection defined by the attached claims.

The invention claimed is:

1. System for reinforcing a weakened area of a wind turbine blade when said blade is mounted on a wind turbine, wherein an interior of the blade comprises a box beam extending from a blade root to a blade tip, wherein the box beam has an open end at the blade root, the system comprising:
   a module comprising a plurality of units including a first unit and a second unit, wherein the first unit comprises means for moving the module along the interior of the box beam, and
   wherein the second unit comprises:
   (a) means for carrying a reinforcing element and for expanding upon activation to press the reinforcement element against the interior of the box beam to repair the weakened area when the first unit moves the module to a position with the second unit adjacent to the weakened area; or
   (b) means for sanding the weakened area when the first unit moves the module to a position with the second unit adjacent to the weakened area; or
   (c) means for suctioning dirt or dust from the weakened area when the first unit moves the module to a position with the second unit adjacent to the weakened area; or
   (d) means for applying a cleaning material to the weakened area when the first unit moves the module to a position with the second unit adjacent to the weakened area.

2. System according to claim 1, wherein the second unit is detachably coupled to the first unit and the system comprises a set of additional units, each of which can be coupled to the first unit when the second unit is detached from the first unit.

3. System according to claim 2, wherein the second unit comprises the means for carrying and expanding, wherein the means for carrying and expanding comprises at least two fasteners for fastening the reinforcement element while the module moves to the weakened area of the blade, and at least two expandable arms that expand to press the at least two ribs onto the interior of the box beam when the second unit is adjacent the weakened area of the blade.

4. System according to claim 3, wherein the means for carrying and expanding further comprises means for spacing the at least two fasteners from walls of the box beam to keep the at least two fasteners from touching the box beam walls while the module moves to the weakened area of the blade.

5. System according to claim 2, wherein the first unit comprises: a body comprising:
  a motor,
  a notched wheel coupled to said body and activated by the motor, wherein said notched wheel is adapted to roll along a first box beam wall; and
  an articulated arm protruding from said body, wherein said articulated arm is adapted to remain in contact with a second box beam wall that is diametrically opposed to the first box beam wall while the module moves inside the box beam.

6. System according to claim 2, wherein the set of additional units comprises a unit comprising means for applying at least one chemical product or detergent on an inner surface of the box beam walls.

7. System according to claim 2, wherein the second unit comprises the means for carrying and expanding and the set of additional units comprises the means for sanding.

8. System according to claim 7, wherein the means for sanding comprises a grinder mounted on a mobile head and a first actuator to move said mobile head on a path contained on a plane perpendicular to an inner surface of the walls of the box beam.

9. System according to claim 8, wherein the means for sanding comprises secondary actuator to bring said mobile head to an oscillating movement depending on a path contained on a plane parallel to the inner surface.

10. System according to claim 9, wherein the means for sanding comprises sensors arranged on the mobile head to delimit the path of said oscillating movement when detecting a box beam wall.

11. System according to claim 2, wherein the second unit comprises the means for carrying and expanding and the set of additional units comprises the means for suctioning dirt or dust from the weakened area when the first unit moves the module to the weakened area, wherein the means for suctioning comprises an intake mouth, means to adapt a size of said intake mouth to a transversal section of the box beam; and at least two wheels as a spacer element mounted on both sides of the intake mouth to ensure a separation between the inner surface of the box beam and the intake mouth.

12. The system according to claim 1, wherein the module comprises a video camera and a lighting system.

13. System according to claim 1, wherein said system comprises a control unit interconnected with the module and, a support adapted to secure said control unit inside the blade root.

14. The system according to claim 1, wherein the system comprises a positioning element that anchors to the box beam near the blade root and a guide bar placed on the box beam between the module and said positioning element; wherein said guide bar comprises one or more sections connected together and coupled as the module moves along the box beam; and wherein the positioning element prevents the transversal movement of the guide bar inside the box beam.

15. Method for reinforcing a weakened area of a wind turbine blade, comprising:
  (a) providing the system of claim 1;
  (b) transporting a reinforcement element inside the box beam from the blade root to said weakened area, and
  (c) applying the reinforcement element on an interior of the box beam in said weakened area.

16. The system according to claim 1, wherein the first unit comprises means for spacing the first unit from the walls of the box beam to prevent a body of the first unit from contacting the box beam walls while the first unit moves inside the box beam.

* * * * *